United States Patent
Büttner et al.

(10) Patent No.: US 9,515,536 B2
(45) Date of Patent: Dec. 6, 2016

(54) COOLING SYSTEM FOR AN ASYNCHRONOUS ROTOR

(75) Inventors: Klaus Büttner, Hollstadt (DE); Klaus Kirchner, Ostheim (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 1216 days.

(21) Appl. No.: 13/496,093

(22) PCT Filed: Sep. 10, 2010

(86) PCT No.: PCT/EP2010/063275
§ 371 (c)(1),
(2), (4) Date: Mar. 14, 2012

(87) PCT Pub. No.: WO2011/032887
PCT Pub. Date: Mar. 24, 2011

(65) Prior Publication Data
US 2012/0169158 A1 Jul. 5, 2012

(30) Foreign Application Priority Data
Sep. 17, 2009 (EP) .................................. 09170558

(51) Int. Cl.
*H02K 9/20* (2006.01)
*H02K 1/32* (2006.01)
(Continued)

(52) U.S. Cl.
CPC ........ *H02K 9/20* (2013.01); *H02K 1/32* (2013.01); *H02K 15/0012* (2013.01);
(Continued)

(58) Field of Classification Search
CPC .......... H02K 1/32; H02K 9/20; H02K 17/165; H02K 17/18; H02K 15/0012
See application file for complete search history.

(56) References Cited

U.S. PATENT DOCUMENTS 1,375,461 A * 4/1921 Kimble ..................... 310/211
3,488,532 A * 1/1970 Anderson et al. ............ 310/58
(Continued)

FOREIGN PATENT DOCUMENTS

CN 101095274 A 12/2007
DE 2052839 A1 4/1972
(Continued)

OTHER PUBLICATIONS

Machine Translation of DE 2052389.*
(Continued)

*Primary Examiner* — Burton Mullins
(74) *Attorney, Agent, or Firm* — Henry M. Feiereisen LLC.

(57) ABSTRACT

A cage rotor for an synchronous machine includes a laminated rotor core, shorting bars arranged inside the laminated rotor core, shorting rings which are cast onto the laminated rotor core and which electrically interconnect the shorting bars to front sides of the laminated rotor core, and heat pipes introduced into the laminated rotor core in the axial direction such that they protrude onto the front side from the laminated rotor core and protrude into the shorting rings.

24 Claims, 3 Drawing Sheets

(51) Int. Cl.
  *H02K 15/00* (2006.01)
  *H02K 17/16* (2006.01)
  *H02K 17/18* (2006.01)

(52) U.S. Cl.
  CPC ........... *H02K 17/165* (2013.01); *H02K 17/18* (2013.01); *Y10T 29/49009* (2015.01)

(56) References Cited

U.S. PATENT DOCUMENTS

| | | | |
|---|---|---|---|
| 3,801,843 A * | 4/1974 | Corman et al. | 310/52 |
| 6,085,833 A * | 7/2000 | Kimura et al. | 165/185 |
| 6,710,498 B1 * | 3/2004 | Lee et al. | 310/211 |
| 7,635,932 B2 | 12/2009 | Matin et al. | |
| 8,836,193 B2 * | 9/2014 | Buttner et al. | 310/125 |
| 2003/0066638 A1 * | 4/2003 | Qu et al. | 165/186 |
| 2004/0012983 A1 * | 1/2004 | Fearing et al. | 363/16 |
| 2005/0061486 A1 * | 3/2005 | Yang | 165/104.33 |
| 2006/0066156 A1 * | 3/2006 | Dong et al. | 310/54 |
| 2006/0227506 A1 * | 10/2006 | Lee et al. | 361/697 |
| 2010/0247347 A1 * | 9/2010 | Yoshino et al. | 417/410.1 |

FOREIGN PATENT DOCUMENTS

| | | | |
|---|---|---|---|
| DE | 4308683 A1 | 9/1994 | |
| GB | 222860 A * | 6/1925 | ............ H02K 17/18 |
| GB | 222861 A * | 9/1925 | ............ H02K 17/18 |
| JP | 55074271 U | 5/1980 | |
| JP | 1177849 A | 7/1989 | |
| JP | 8205492 A | 8/1996 | |
| RU | 2075150 C1 | 3/1997 | |
| SU | 752633 A1 | 7/1980 | |

OTHER PUBLICATIONS

Machine Translation of DE 4308683.*
PTO 15/1546 Translation of JP 01-177849.*
Machine Translation of JP H08-205492.*
PTO 15/1545 translation of JP 55-74271 U (1980), Shouji, Squirrel Cage Rotor.*
PTO 15/1868 translation of DE 43-08-683 A1, Brandes, Squirrel-Cage Rotor for an Asynchronous Machine.*

* cited by examiner

COOLING SYSTEM FOR AN ASYNCHRONOUS ROTOR

CROSS-REFERENCE TO RELATED APPLICATIONS

This application is the U.S. National Stage of International Application No. PCT/2010/063275, filed Sep. 10, 2010, which designated the United States and has been published as International Publication No. WO 2011/032887 and which claims the priority of European Patent Application, Serial No. 09170558.2, filed Sep. 17, 2009, pursuant to 35 U.S.C. 119(a)-(d).

BACKGROUND OF THE INVENTION

The invention relates to a squirrel cage rotor for an asynchronous machine, said rotor comprising a laminated rotor core having shorting rings which are cast onto the end faces of the laminated rotor core. The invention is concerned in particular with the cooling system of such a squirrel cage rotor.

In addition, the invention relates to a method for producing such a squirrel cage rotor in which a corresponding cooling system is provided.

In order to increase the efficiency of an electrical machine, various cooling techniques are used in which the heat produced in the stator and rotor is dissipated to the surroundings. The temperature rise in the rotor is generally greater than in the stator. It is more difficult, however, to remove the heat from a rotating component such as the rotor.

A squirrel cage rotor for an asynchronous machine is known from DE 43 08 683 A1 and comprises shorting bars which are arranged in slots of a laminated rotor core and, at the two end faces of the laminated rotor core, are connected mechanically and in an electrically conducting manner to shorting rings produced in the aluminum die-cast process.

A routine method for dissipating heat from a rotor of this type is to design the shorting ring to have blades in order to enable heat dissipation from the motor interior. The effectiveness of such a cooling method depends on the speed of the motor. The blades on the shorting ring become less effective at dissipating heat as the number of poles in a machine increases. The effectiveness of such a cooling method also reduces with the axial length of the laminated rotor core because it then becomes increasingly difficult to enable sufficient heat removal along the entire rotor core length.

SUMMARY OF THE INVENTION

The object of the invention is to improve the heat dissipation from a squirrel cage rotor of an asynchronous machine.

This object is achieved by a squirrel cage rotor for an asynchronous machine, including:
  a laminated rotor core,
  shorting bars arranged inside the laminated rotor core, and
  shorting rings which are cast onto the laminated rotor core and which connect the shorting bars together electrically at the end faces of the laminated rotor core, and
  heat pipes are inserted in the laminated rotor core in an axial direction, which extend out of the laminated rotor core at the end faces and into the shorting rings.

The object is also achieved by a method for producing a squirrel cage rotor for an asynchronous machine in which method, heat pipes are inserted in slots in a laminated rotor core, and shorting rings are cast onto the end faces of the laminated rotor core and onto the heat pipes in such a manner that they electrically connect together shorting bars of the squirrel cage rotor, and such that the heat pipes extend out of the laminated rotor core at the end faces and into the shorting rings.

The dependent claims contain advantageous embodiments of the invention.

The invention is based on the knowledge that in a squirrel cage rotor having shorting rings cast onto the end faces, said shorting rings can be used as an excellent means of heat dissipation by casting them directly onto the ends of heat pipes. Said heat pipes, which may be in the form of thermosiphons, penetrate the laminated rotor core substantially axially. They transfer the heat produced in the laminated rotor core to the two axial ends of the rotor. At these ends, they are integrally cast into the shorting rings, thereby enabling practically optimum heat conduction across the contact between the heat pipes and the shorting rings. The shorting rings, which have a large surface area, perform the role of condenser for the heat pipes, and therefore an effective heat cycle is created very simply.

In an advantageous embodiment of the invention, the heat dissipation from the laminated rotor core is further increased by the heat pipes extending in an axial direction out of the shorting rings on the side that faces away from the laminated rotor core. That part of the heat pipes that extends out of the shorting rings thereby performs the role of fan blades and hence boosts convection.

In a further advantageous embodiment of the invention, the shorting rings are made of aluminum and the heat pipes are made of copper, wherein an alloy layer is formed on the heat pipes, in particular by electroplating, in those zones in which the heat pipes are arranged inside the shorting rings. Aluminum shorting rings have the advantage that the moment of inertia of the rotor can thereby be reduced significantly compared with heavy shorting rings made of copper. In addition, aluminum is ideally suited to a casting process because of its relatively low melting point. Using heat pipes made of copper has the advantage that thermal conduction is particularly efficient because copper has a very high thermal conductivity. To optimize the thermal contact conductance between the heat pipes and the shorting rings, the heat pipes are coated in a mixed crystalline alloy layer in this embodiment. Such a coating may be applied by electroplating. For example, an electroplated aluminum layer is a possibility. Alternatively, tinning the heat pipes is also possible in order to produce the desired reduction in the thermal contact resistance. An alloy layer improves both the thermal connection and the mechanical bond between the heat pipes and the shorting rings; it effectively prevents the heat pipes from detaching from the shorting rings as a result of thermal stress cycles during operation of the asynchronous machine, and it also reduces the electrical contact resistance between the heat pipes and the shorting rings. This is particularly advantageous when the heat pipes are used not only for heat dissipation but also additionally as shorting bars in the asynchronous machine.

An advantageous embodiment of the invention is characterized in that the laminated rotor core comprises first slots, in which the shorting bars are arranged, and second slots, in which the heat pipes are arranged. The second slots can preferably be in the form of axial holes. The heat pipes are inserted in said holes before the shorting rings are cast on.

In particular when a heat pipe in each case has a higher electrical resistance between the shorting rings than a shorting bar, an embodiment of the invention is advantageous in which the second slots are arranged further outwards than the first slots, viewed in the radial direction of the squirrel cage rotor. In this case, the heat pipes can be used as starting bars because of their higher electrical resistance. Owing to the skin effect, starting bars must be arranged further outwards than the operating bars, viewed in the radial direction, in order to perform their intended purpose. The higher electrical resistance of the starting bars results in a higher starting machine torque.

If, on the other hand, a heat pipe in each case has a lower electrical resistance between the shorting rings than a shorting bar, then an embodiment of the invention is advantageous in which the first slots are arranged further outwards than the second slots, viewed in the radial direction of the squirrel cage rotor. This may be the case, for example, when the heat pipes are made of copper and the shorting bars of aluminum. For example, it is possible that in an aluminum die-cast process, the first slots are filled with aluminum melt at the same time as the shorting rings are cast on. The shorting bars and the shorting rings are thereby formed in one process. A squirrel cage rotor of this type is very cheap to produce.

The operating bars, on the other hand, are made in the form of copper heat pipes, which have a relatively low electrical resistance.

Irrespective of whether the heat pipes are used as operating bars or starting bars, they can advantageously also have a tapered design. In this case it is particularly advantageous for the shorting bars also to be tapered. A squirrel cage rotor of this type comprises tapered starting bars and operating bars, with one of these bar types being formed by the heat pipes depending on the embodiment. Tapering the rotor has a positive effect on the starting performance of the asynchronous machine. The tapering compensates for alternating torques, which are caused by harmonics in the air-gap field.

A further advantageous embodiment of the invention is characterized in that a first slot is in each case connected to a respective second slot via a connecting bridge to form a double-bar slot. If a die-cast aluminum process is now used, for example, in order to make the shorting rings and the shorting bars, then the heat pipe is inserted first in the second slot. Then the laminated rotor core fitted with the heat pipes is placed in a die-cast mold. Here, the aluminum melt is applied under pressure, with the melt penetrating into the first slots and into the connecting bridges, and filling these areas. At the same time, the shorting rings are cast onto the heat pipes that extend out of the laminated rotor core at the end faces.

A particularly high electrical efficiency can be achieved in a hybrid construction in a further advantageous embodiment of the invention by making the shorting bars out of copper, and by arranging cast bars in the first slots, said cast bars filling a residual cross-section that is not filled by the shorting bars in the first slots, wherein the cast bars and the shorting rings are made of aluminum. The copper shorting bars significantly increase the conductivity and hence the efficiency of the squirrel cage rotor. The aluminum melt that fills the residual cross-section mechanically fixes the shorting bars inside the slot in an excellent manner.

Since the heat pipes are arranged in a rotating element, i.e. the squirrel cage rotor, they need not necessarily comprise the capillary inlay that is normally used in heat pipes. A capillary device is not necessary because during operation of the asynchronous machine, centrifugal forces act on the heat pipe, whereby the liquid contained therein is pushed outwards. Thus a heat cycle can be realized in an advantageous embodiment of the invention by the heat pipes being designed such that a medium enclosed in a heat pipe can circulate under the action of the centrifugal force during rotation of the squirrel cage rotor. In the laminated rotor core, which is the hottest point on the heat pipe, the liquid film positioned towards the outside because of the centrifugal force evaporates. The vapor produced thereby is forced inwards by the displacing liquid in the cycle and moves axially at high-speed towards the shorting ring, which in this case performs the task of condenser. Here, the vapor is finally converted back to a liquid. The medium in the liquid state finally returns under the action of the centrifugal force to lie on the outer-lying side of the heat pipe.

If a squirrel cage rotor according to one of the previously described embodiments is combined with a stator, an asynchronous machine is obtained that has a far better efficiency than conventional asynchronous machines because of the efficient cooling.

BRIEF DESCRIPTION OF THE DRAWING

The invention is described below in greater detail with reference to the embodiments shown in the drawings, in which.

DETAILED DESCRIPTION OF THE PREFERRED EMBODIMENTS

Figure 1:
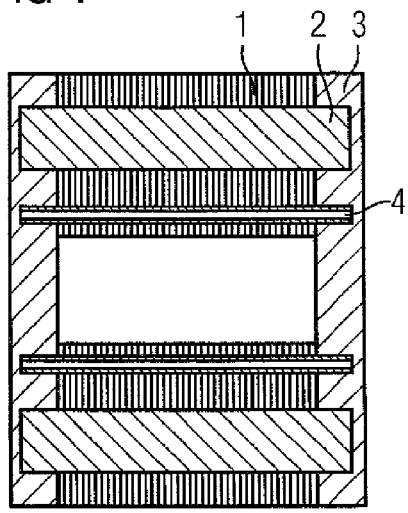
FIG. 1 shows in cross-section a first embodiment of a laminated rotor core containing heat pipes.

FIG. 1 shows in cross-section a first embodiment of a laminated rotor core 1 containing heat pipes 4. The laminated rotor core 1 is constructed of axially stacked electrical plates that are electrically insulated from one another. This construction reduces iron losses and eddy-current losses in the laminated rotor core 1.

In addition, the laminated rotor core 1 comprises first slots, in which shorting bars 2 are arranged. In order to achieve a maximum possible electrical efficiency, these shorting bars 2 are made of copper.

In addition, the laminated rotor core 1 comprises second slots in the form of axial holes, in which the heat pipes 4 are arranged. Viewed in the radial direction of the laminated rotor core 1, the heat pipes 4 and hence the second slots are located further inwards than the shorting bars 2 or the first slots.

In the manufacture of the squirrel cage rotor shown here, the shorting bars 2 and the heat pipes 4 are first inserted in the relevant slots. Then the laminated rotor core fitted with said parts is placed in a die-cast mold. Here, end-face shorting rings 3 are cast onto the laminated rotor core 1. The shorting rings 3 surround the axial ends of the shorting bars 2 and of the heat pipes 4. This results in excellent mechanical, electrical and thermal contact between the shorting bars 2 and the shorting rings 3 and between the heat pipes 4 and the shorting rings 3 in the area of these ends.

In order to make the bond between these elements even stronger, both the shorting bars 2 and the heat pipes 4 have been coated before insertion in the laminated rotor core 1. In this case, the heat pipes 4 and the shorting bars 2 have been coated in an aluminum layer. This aluminum layer must be applied at least in the area in which the shorting bars 2 or the heat pipes 4 extend into the shorting rings 3 after the die-casting process. In particular, electroplating these elements produces an alloy layer between the shorting bars 2 and the shorting rings 3 and between the heat pipes 4 and the shorting rings 3. A mixed crystalline zone is formed that results in a particularly strong mechanical bond. This mixed crystalline bond withstands even load cycles, which can produce stresses inside the rotor.

The contact conductance between the shorting bars 2 and the shorting rings 3 still remains very low even after numerous cycles. Likewise, the thermal contact conductance between the heat pipes 4, which are here made of copper by way of example, and the shorting rings 3 remains extremely high, and therefore there can be excellent dissipation of heat from the heat pipes 4, for example in the form of thermosiphons, into the shorting rings 3. The shorting rings 3 provide a condenser of large surface area for the thermosiphons.

Figure 2:
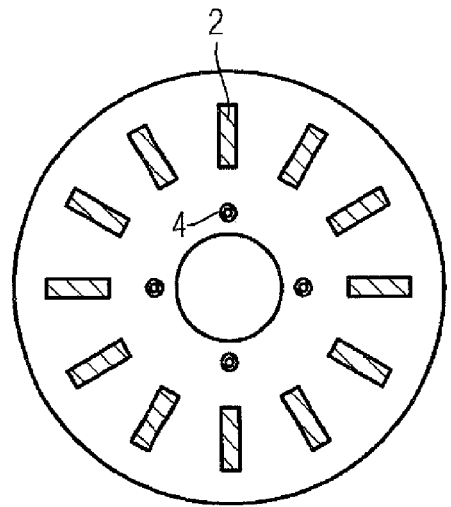
FIG. 2 shows the first embodiment in a radial cross-section.

FIG. 2 shows the first embodiment in a radial cross-section. The radial cross-section has been made through a shorting ring. The number of first slots, which carry the shorting bars 2, is significantly greater than the number of second slots, which are provided for the heat pipes 4. This can obviously be varied according to a demand at hand. If a larger amount of heat needs to be carried away out of the rotor, then more heat pipes 4 must be provided than the four shown here. It is likewise possible and included in the invention to use the heat pipes 4 also as shorting bars for the asynchronous rotor.

Figure 3:
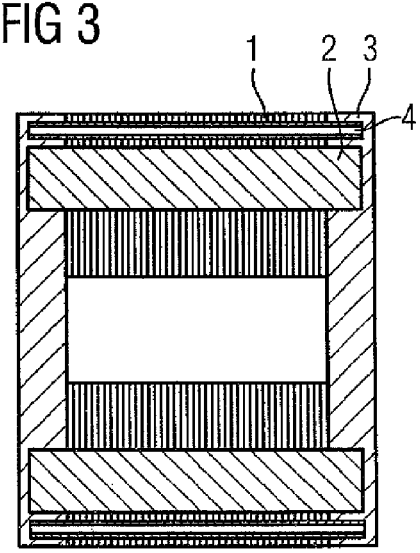
FIG. 3 shows in cross-section a second embodiment of a laminated rotor core containing heat pipes.

For example, FIG. 3 shows in cross-section a second embodiment of a laminated rotor core 1 containing heat pipes 4. Like the embodiment of FIG. 1, first slots for holding shorting bars 2 are provided and second slots in the form of an axial hole for holding the heat pipes 4 are again provided here. In this embodiment, the second slots and hence the heat pipes 4 are arranged towards the outside viewed axially, i.e. in the vicinity of the outer sheath. The shorting bars 2, which are again made of copper in this case, are located towards the inside viewed in the radial direction of the rotor, i.e. nearer the rotor shaft. In this embodiment, the heat pipes 4, which are likewise made of copper, are used as starting bars for the asynchronous rotor. Their cross-sectional area is significantly less than that of the shorting bars 2. Hence the electrical resistance that the heat pipes present between the two shorting rings is significantly higher than that of the shorting bars 2.

Owing to the skin effect, during the starting torque, the currents in the rotor are forced towards the outer circumference of the rotor, i.e. towards the second slots. Therefore they flow in the more poorly conducting heat pipes 4. This improves the starting performance of the asynchronous machine. As the rotor approaches the rated speed, the current flow shifts more and more onto the shorting bars 2, which have significantly better conductance. This reduces the rotor losses and improves the electrical efficiency. In this embodiment, there is no need to provide additional starting bars, as is often implemented in a squirrel cage rotor according to the prior art in order to improve the starting performance. The heat pipes 4, which are in the form of thermosiphons for example, advantageously also take on the function of the starting bars.

Figure 4:
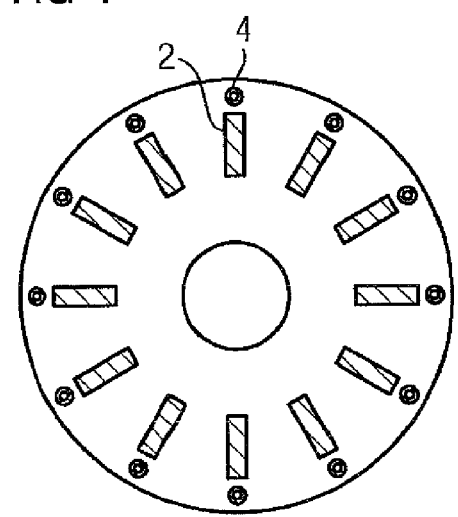
FIG. 4 shows the second embodiment in a radial cross-section.

FIG. 4 shows the second embodiment in a radial cross-section. It is evident here that one heat pipe 4 is provided for each shorting bar 2. Hence each operating bar, which is formed by the shorting bars 2, is also assigned a starting bar in the form of a thermosiphon.

Figure 5:
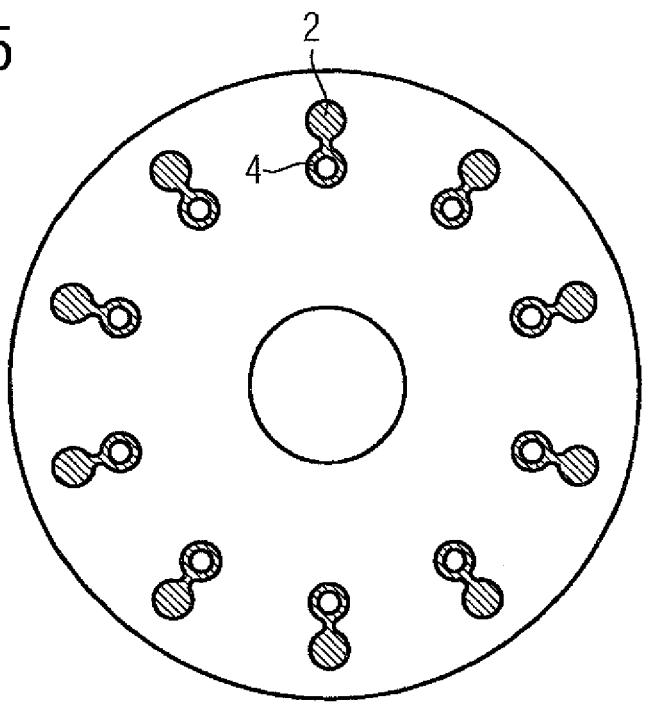
FIG. 5 shows a third embodiment of a laminated rotor core containing heat pipes.

FIG. 5 shows a third embodiment of a laminated rotor core containing heat pipes 4. In this case, both the heat pipes 4 and the shorting bars 2 are arranged in "double-bar slots", i.e. in this arrangement the first slot, which is provided for the shorting bar 2, is connected via a thin connecting bridge to the second slot, which is provided for the heat pipe 4. The drawing shows a cross-section through the laminated rotor core and hence through the shorting bars 2 and the heat pipes 4. Viewed radially, the heat pipes 4 are arranged further inwards than the shorting bars 2. Such an arrangement makes sense particularly when the electrical resistance that the heat pipes 4 present between the two shorting rings is less than the electrical resistance that the shorting bars 2 present between the two shorting rings.

Normally, the cross-sectional area of the heat pipes 4 is less than that of the shorting bars 2, which are of solid construction. If, however, aluminum shorting bars, for instance made from an aluminum die-cast melt, and copper heat pipes 4 are used, then such an arrangement can definitely be useful. This is because for this choice of materials, the electrical resistance of the heat pipes could turn out to be lower than that of the shorting bars. In such an embodiment, in order to improve the starting performance, the heat pipes 4 would be arranged nearer to the inside viewed in a radial direction, i.e. in the vicinity of the rotor shaft. In this case, the aluminum shorting bars 2 would assume the role of the starting bars.

Figure 6:
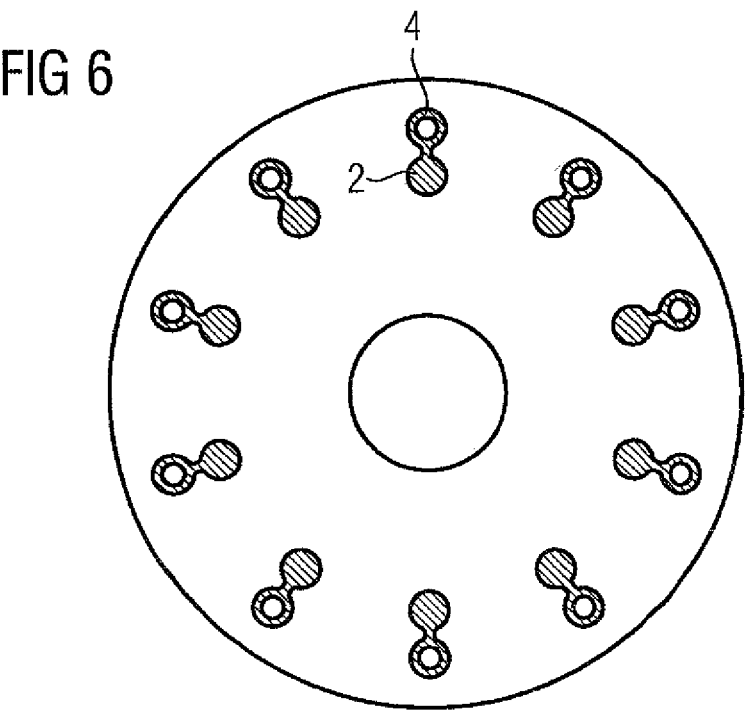
FIG. 6 shows a fourth embodiment of a laminated rotor core containing heat pipes.

FIG. 6 shows a fourth embodiment of a laminated rotor core containing heat pipes 4. Again in this case, as in FIG. 5, double-bar slots are provided for holding the shorting bars 2 and the heat pipes 4. Here, however, the shorting bars 2 lie towards the inside viewed radially, and the heat pipes 4 lie towards the outside viewed radially. This arrangement makes sense when the shorting bars 2 present a better electrical conductance between the two shorting rings than the heat pipes 4. This is particularly the case when shorting bars 2 and heat pipes 4 are made of the same material, for example copper or aluminum. In this case, the heat pipes 4 act as the starting bars and the shorting bars 2 act as the operating bars.

Figure 7:
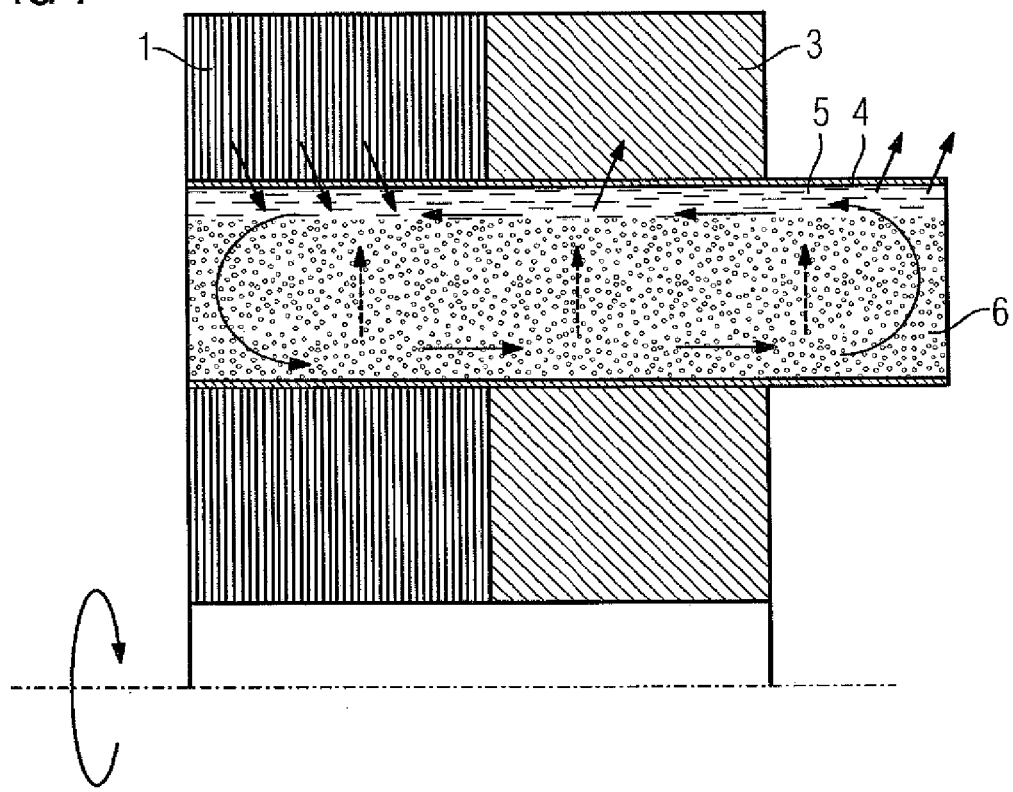
FIG. 7 shows how a heat pipe works.

FIG. 7 shows how a heat pipe 4 works in a rotating squirrel cage rotor. The figure shows a cross-section through a heat pipe 4, the laminated rotor core 1 and a shorting ring 3, which has been cast onto an end face of the laminated rotor core 1. The heat pipe 4 extends further out of the shorting ring 3 from the side of the shorting ring that faces away from the laminated rotor core 1. This part of the heat pipe 4 that extends outside acts as a fan blade and hence further improves the air circulation.

Inside the heat pipe 4, which is in the form of a thermosiphon, there is a medium which is partially in the liquid state and partially in the gaseous state. The liquid 5 is forced by the centrifugal force produced by the rotation of the squirrel cage rotor towards the circumference of the squirrel cage rotor. Hence, steam 6 is located towards the inside viewed radially. In the rotor core, which is the hottest point on the thermosiphon, the liquid film positioned towards the outside evaporates. The steam 6 is pushed inwards by the displacing fluid 5 in the cycle and moves axially at high speed towards the shorting ring 3, which acts as a condenser. Here the steam 6 turns back to a liquid. The medium in the liquid state finally returns under the action of the centrifugal force to lie on the outer-lying side of the heat pipe.

Figure 8:
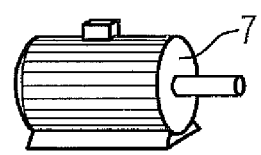
FIG. 8 shows an asynchronous machine containing a laminated rotor core according to an embodiment of the invention.

FIG. 8 shows an asynchronous machine 7 having a laminated rotor core according to an embodiment of the invention. The asynchronous machine 7 is characterized here by a particularly high electrical efficiency. In this embodiment, unlike the previously described embodiments, a copper die-cast rotor is used. In the manufacture of this copper die-cast rotor, the laminated rotor core is first fitted with heat pipes, as already described in connection with the other embodiments. These heat pipes are inserted in suitable slots in the laminated rotor core. The laminated rotor core fitted with said parts is then placed in a die-cast mold. In this die-cast mold, a copper melt is applied, which forms the shorting rings on the end faces and fills additional slots in the laminated rotor core. Once the melt has set, copper shorting bars are produced in the additional slots.

The invention claimed is:

1. A squirrel cage rotor for an asynchronous machine comprising:
  a laminated rotor core;
  shorting bars arranged inside the laminated rotor core;
  shorting rings made of aluminum and cast onto the laminated rotor core to connect the shorting bars with one another electrically at end faces of the laminated rotor core;
  heat pipes made of copper and inserted in the laminated rotor core in an axial direction, said heat pipes being spaced from the shorting bars in a transverse direction and extending out of the laminated rotor core into the shorting rings; and
  an alloy layer applied on the heat pipes in zones in which the heat pipes are arranged inside the shorting rings,
  wherein the shorting rings are cast shorting rings and surround axial ends of the shorting bars and axial ends of the heat pipes around a periphery and at an axial end face of each of the shorting bars and of each of the heat pipes.

2. The squirrel cage rotor of claim 1, wherein the heat pipes extend in the axial direction out of the shorting rings on a side that faces away from the laminated rotor core.

3. The squirrel cage rotor of claim 1, wherein the laminated rotor core has first slots in which the shorting bars are arranged, and second slots in which the heat pipes are arranged.

4. The squirrel cage rotor of claim 3, wherein the second slots are arranged further outwards that the first slots, when viewed in a radial direction of the squirrel cage rotor, said heat pipes having a higher electrical resistance than the shorting bars between the shorting rings.

5. The squirrel cage rotor of claim 3, wherein the first slots are arranged further outwards than the second slots, when viewed in a radial direction of the squirrel cage rotor, said heat pipes having a lower electrical resistance than the shorting bars between the shorting rings.

6. The squirrel cage rotor of claim 3, wherein the first slots and the second slots are connected to one another in one-to-one correspondence, with each first slot connected to associated one of the second slots via a connecting bridge to form a double-bar slot.

7. The squirrel cage rotor of claim 3, wherein the shorting bars are made of copper, and further comprising cast bars arranged in the first slots to fill a residual cross section that is not filled by the shorting bars in the first slots, said cast bars being made of aluminum.

8. The squirrel cage rotor of claim 1, wherein the shorting bars are cast of aluminum.

9. The squirrel cage rotor of claim 1, wherein the heat pipes are designed to enable a medium enclosed in the heat pipes to circulate under the action of a centrifugal force during rotation of the squirrel cage rotor.

10. The squirrel cage rotor of claim 1, wherein the shorting rings are configured as uninterrupted shorting rings which uninterruptedly cover the end faces of the laminated rotor core from opposite outer sides of the laminated rotor core as considered in the axial direction, and the shorting bars and the heat pipes extend into the uninterrupted shorting rings from inner sides of the uninterrupted shorting rings.

11. An asynchronous machine, comprising:
  a stator;
  a squirrel cage rotor interacting with the stator and including a laminated rotor core, shorting bars arranged inside the laminated rotor core, shorting rings made of aluminum and cast onto the laminated rotor core to connect the shorting bars with one another electrically at end faces of the laminated rotor core, heat pipes made of copper and inserted in the laminated rotor core in an axial direction, said heat pipes being spaced from the shorting bars in a transverse direction and extending out of the laminated rotor core into the shorting rings, and an alloy layer applied on the heat pipes in zones in which the heat pipes are arranged inside the shorting rings, wherein the shorting rings are cast shorting rings and surround axial ends of the shorting bars and axial ends of the heat pipes around a periphery and at an axial end face of each of the shorting bars and of each of the heat pipes.

12. The asynchronous machine of claim 11, wherein the heat pipes extend in the axial direction out of the shorting rings on a side that faces away from the laminated rotor core.

13. The asynchronous machine of claim 11, wherein the laminated rotor core has first slots in which the shorting rings are arranged and second slots, in which the heat pipes are arranged.

14. The asynchronous machine of claim 13, wherein the second slots are arranged further than the first slots, when viewed in a radial direction of the asynchronous machine, said heat pipes having a higher electrical resistance than the shorting bars between the shorting rings.

15. The asynchronous machine of claim 13, wherein the first slots are arranged further outwards than the second slots in a radial direction of the asynchronous machine, said heat pipes having a lower electrical resistance than the shorting bars between the shorting rings.

16. The asynchronous machine of clam 13, wherein the first slots and the second slots are connected to one another in one-to-one correspondence, with each slot connected to an associated one of the second slots via a connecting bridge to form a double-bar slot.

17. The asynchronous machine of clam 13, wherein the shorting bars are made of copper, and further comprising cast bars arranged in the first slots to fill a residual cross-section that is not filled by the shorting bars in the first slots, said cast bars being made of aluminum.

18. The asynchronous machine of claim 11, wherein the shorting bars are cast of aluminum.

19. The asynchronous machine of claim 11, wherein the shorting rings are configured as uninterrupted shorting rings which uninterruptedly cover the end faces of the laminated rotor core from opposite outer sides of the laminated rotor core as considered in the axial direction, and the shorting bars and the heat pipes extend into the uninterrupted shorting rings from inner sides of the uninterrupted shorting rings.

20. A method of producing a squirrel cage rotor for an asynchronous machine, comprising:
   inserting heat pipes of copper in first slots in a laminated rotor core;
   casting shorting rings from aluminum onto ends faces of the laminated rotor core and onto the heat pipes so as to electrically connect together shorting bars spaced transversely from the heat pipes and arranged inside the laminated rotor core and to enable the heat pipes to extend out of the laminated rotor core into the shorting rings;
   surrounding, by the cast shorting rings, axial ends of the shorting bars and axial ends of the heat pipes around a periphery and at an axial end face of each of the shorting bars and of each of the heat pipes; and
   applying an alloy layer to the heat pipes in zones in which the heat pipes are arranged inside the shorting rings.

21. The method of claim 20, wherein the alloy layer is applied to the heat pipes by electroplating.

22. The method of claim 20, wherein the shorting rings are made of aluminum by a die-cast process.

23. The method of claim 20, wherein the shorting bars are made of copper and arranged in second slots of the laminated rotor core before the shorting rings are cast onto the end faces of the laminated rotor core and onto the heat pipes, said casting step including filling any residual cross-section that remains in the second slots after the shorting bars have been inserted, with casting material, when casting the shorting rings.

24. The method of claim 20, further comprising forming the shorting rings uninterrupted so as to cover the end faces of the laminated rotor core uninterruptedly from opposite outer sides of the laminated rotor core, and extending the shorting bars and the heat pipes into the uninterrupted shorting rings from inner sides of the uninterrupted shorting rings.

* * * * *

UNITED STATES PATENT AND TRADEMARK OFFICE
CERTIFICATE OF CORRECTION

Page 1 of 1

PATENT NO. : 9,515,536 B2
APPLICATION NO. : 13/496093
DATED : December 6, 2016
INVENTOR(S) : Klaus Büttner and Klaus Kirchner It is certified that error appears in the above-identified patent and that said Letters Patent is hereby corrected as shown below:

On the Title Page

Item (54) and in the Specification, Column 1, Lines 1-2, in the title, replace "COOLING SYSTEM FOR AN ASYNCHRONOUS ROTOR" with -- SQUIRREL-CAGE ROTOR WITH HEAT PIPES, SHORTING BARS, AND SHORTING RINGS FOR ASYNCHRONOUS ELECTRIC MACHINE --.

Signed and Sealed this
Seventh Day of February, 2017

Michelle K. Lee
*Director of the United States Patent and Trademark Office*